(No Model.)

T. O. POTTER.
METHOD OF MAKING BUCKLE BLANKS.

No. 332,622.  Patented Dec. 15, 1885.

WITNESSES.
J. M. Dolan
Fred. B. Dolan

INVENTOR.
T. O. Potter
by his attys
Clarke & Raymond

UNITED STATES PATENT OFFICE.

THOMAS O. POTTER, OF BOSTON, MASSACHUSETTS.

METHOD OF MAKING BUCKLE-BLANKS.

SPECIFICATION forming part of Letters Patent No. 332,622, dated December 15, 1885.

Application filed May 2, 1885. Serial No. 164,198. (No model.)

*To all whom it may concern:*

Be it known that I, THOMAS O. POTTER, of Boston, in the county of Suffolk and State of Massachusetts, a citizen of the United States, have invented a new and useful Improvement in the Process of Making Blanks for Buckles, of which the following is a full, clear, and exact description, reference being had to the accompanying drawings, forming a part of this specification, in explaining its nature, in which—

Figure 1:
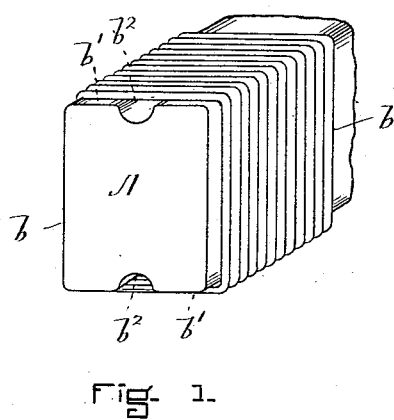
Figure 2:
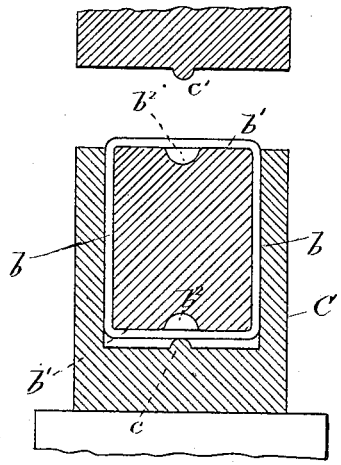
Figure 3:
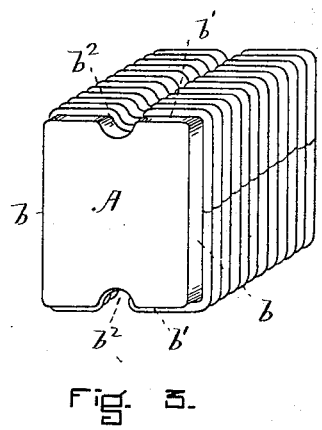
Figure 4:
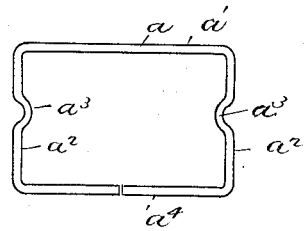

Figure 1 represents a former or arbor, about which is wound continuously the wire from which the buckle-frame is made. Fig. 2 is a central vertical section of a box-die, showing the arbor or form with the wire wound thereon placed therein ready for the operation of the drop-press. Fig. 3 shows in perspective an arbor or form and the wire about the same after it has been submitted to the operation of the dies shown in Fig. 2. Fig. 4 represents in plan the complete buckle-blank.

Referring to the drawings, $a$ represents the buckle-blank. It comprises the top portion, $a'$, the end portions, $a^2$, each of which is curved inwardly at $a^3$ at or near the center of its length, and the lower section, $a^4$.

To form this blank I make an arbor or form, A, of the shape shown in Figs. 1, 2, and 3— that is, its surface has the shape of the interior configuration of the buckle-blank—so that its opposing surfaces $b$ $b$ are parallel, and each of the surfaces $b'$ has a groove, $b^2$, formed therein. This arbor or form I place in a lathe or other suitable device for revolving it, and I then wind wire of suitable size for forming the buckle-blank continuously about it from one end to the other. The arbor or form thus wound with wire is then removed from the lathe and placed in a box-die, C, the under surface of which has the upward-extending former $c$, preferably running lengthwise the same. The sides of this box-die extend upward, and a cavity formed thereby is of a size to admit the placing therein of the arbor or form with the wound wire thereon, as represented in Fig. 2. This box-die is then placed under a press and another die or former, $c'$, having the shape similar to that of the die or former in the lower portion of the box, but projecting in the opposite direction, is placed upon the head of the drop, and is forced thereby upon the arbor or former in the box-die, thereby causing the wire wound thereon to take the shape of the arbor or form, and thereby forming the curves in the end bars of the blank. The arbor or form is then removed from the box-die and the wire blanks completed by cutting the wound wire upon a straight line, as represented in Fig. 3, lengthwise the arbor-frame. This separates the wire into the individual blanks, and the blanks thus formed have the shape shown in Fig. 4. Its upper bar, $a'$, preferably is then flattened by a drop-press to form a flat surface against which the ends of the teeth of the buckle may come in contact.

This method of simultaneously forming a large number of blanks is simple and effective, and very materially reduces the cost of their manufacture.

Having thus fully described my invention, I claim and desire to secure by Letters Patent of the United States—

The method of making buckle-blanks, consisting in winding wire continuously about an arbor or form having the inside configuration of the buckle, and then submitting the wire to a forming operation or manipulation by suitable dies, whereby the wire is brought to the shape of the arbor or form, and in then cutting the wire longitudinally upon the arbor or form to form independent or separate blanks, all substantially as and for the purposes described.

THOMAS O. POTTER.

Witnesses:
F. F. RAYMOND, 2d,
FRED. B. DOLAN.